Nov. 3, 1925.
H. MARQUARDT
WATERING TROUGH
Filed March 14, 1924    2 Sheets-Sheet 1
1,560,088
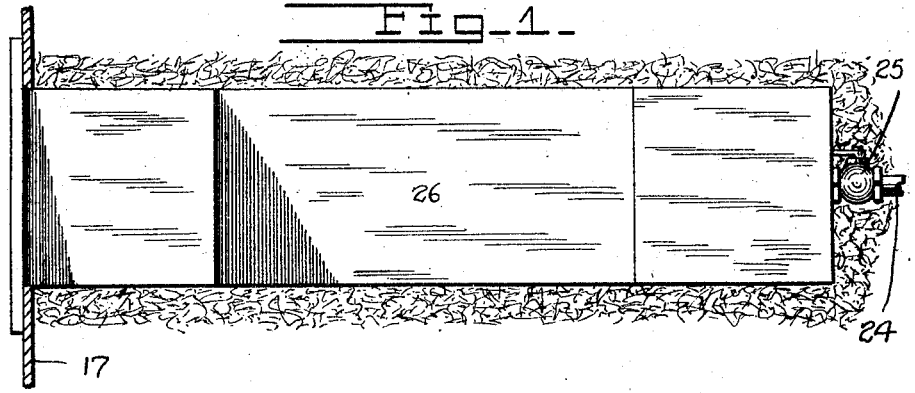
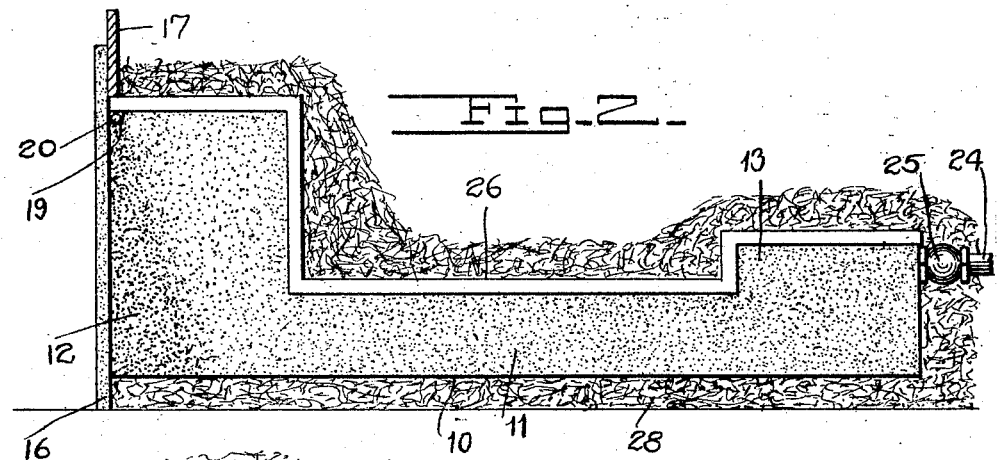
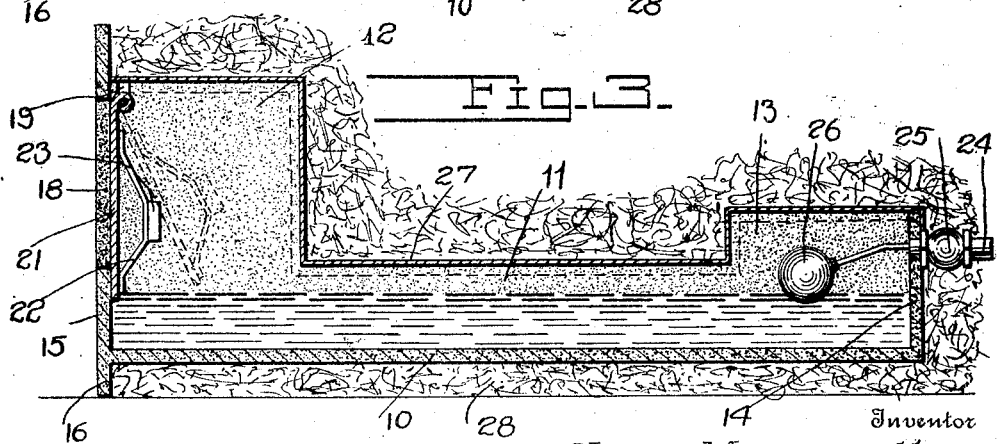
Inventor
Henry Marquardt.
By R. Peele Hrick
Attorney Nov. 3, 1925.    1,560,088
H. MARQUARDT
WATERING TROUGH
Filed March 14, 1924    2 Sheets-Sheet 2
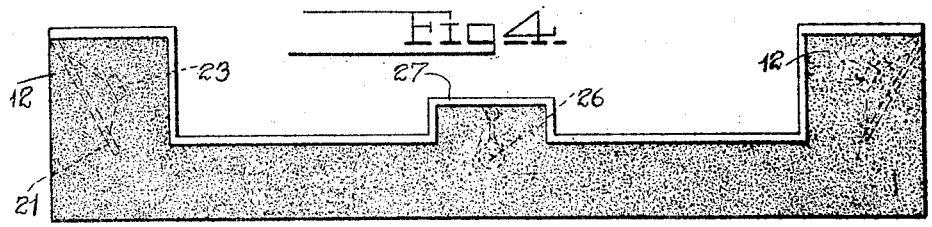
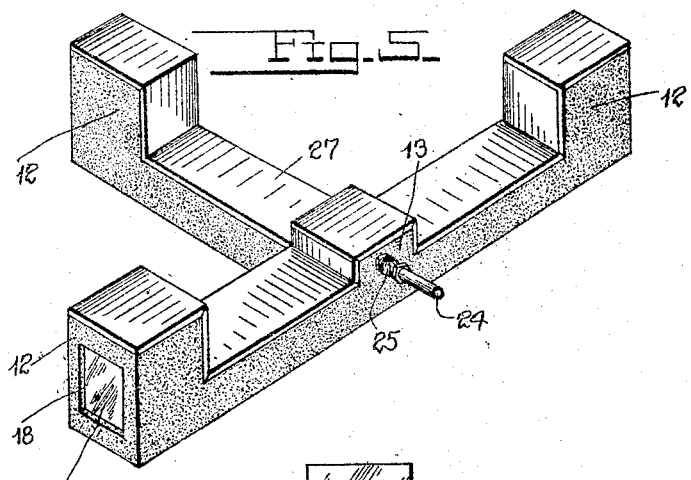
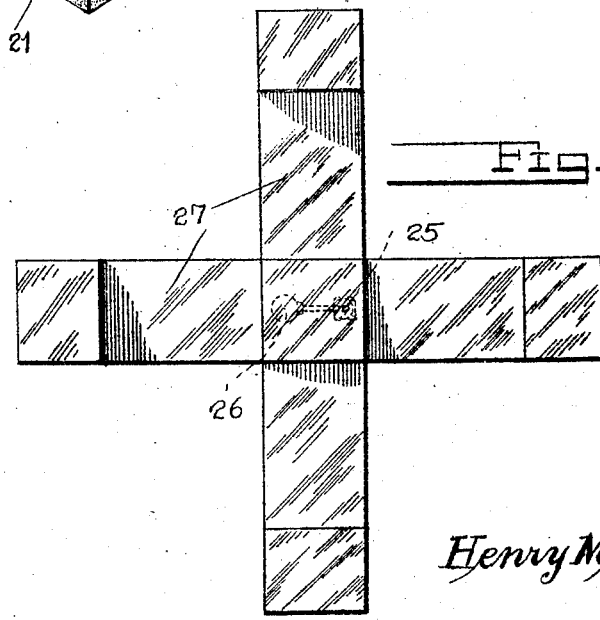
Inventor
Henry Marquardt.
By
Attorney Patented Nov. 3, 1925.

1,560,088

UNITED STATES PATENT OFFICE.

HENRY MARQUARDT, OF NORFOLK, NEBRASKA.

WATERING TROUGH.

Application filed March 14, 1924. Serial No. 699,262.

*To all whom it may concern:*

Be it known that HENRY MARQUARDT, a citizen of the United States, residing at Norfolk, in the county of Madison and State of Nebraska, has invented certain new and useful Improvements in Watering Troughs, of which the following is a specification.

This invention relates to watering troughs and has special reference to a watering trough for providing hogs, cattle, and horses with water.

The ordinary open type of watering trough for animals is objectionable on various accounts. Among the objections lies the fact that in cold weather the water contained in the trough freezes, and at times the contents of the trough are exposed to contamination through falling of leaves into the trough, the dirt falling from the animal's mouth while drinking out of the trough and other dirt which is difficult to clean out accumulating therein.

Another objection that exists, is that when the ordinary trough is set in the feed lot or pasture, wholly or partly exposed, the animals step into it and rub on or against it causing the same to break.

One important object of the present invention is to improve the general construction of devices of this character.

A second important object of the invention is to provide an improved form of trough which may be placed with its mouth or delivery end accessible through the line fence of the pasture or the like in a position which prevents animals from rubbing on or stepping into it.

A third important object of the invention is to provide an improved trough of this description which may be covered, during cold weather by barnyard litter so that the water in the trough will not freeze, the construction being such as to prevent contamination of the water as much as possible by the covering material and facilitate cleaning.

An important object of the invention is to provide an improved swinging closure for a trough of this character.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of a trough constructed with accordance to this invention.

Figure 2 is a side elevation thereof.

Figure 3 is a longitudinal section therethrough.

Figure 4 is a side elevation of a modification of this device having two mouths or drinking ends.

Figure 5 is a perspective view showing a second modification having three mouths.

Figure 6 is a plan view of a third modification having four mouths.

In the embodiment of the invention herein shown the trough has been indicated as being constructed of sheet metal and, while this material is preferable, other materials may be used for the purpose and it is to be understood that the invention is not confined to the use of any particular material of construction. In the construction the trough is provided with a bottom 10 and side walls 11 which at the forward end extend upwardly as at 12 and at the rear end extend upwardly to a less extent as at 13. Between the rear end of the side walls extends the rear wall 14 and similarly at the front end there is provided a front wall 15 which extends outwardly around the trough body portion to provide flanges 16 which are adapted to rest against the boards, rails or the like, of a line fence 17. This front wall 15 is provided with an access opening 18 and just back of the front wall the side walls are provided with notches 19 to receive the ends of a rod 20 carrying a closure flap or door 21, preferably made of sheet metal. On the back of this door there is vertically disposed a resilient strip 22 which is bowed rearwardly at its center and on this rearwardly bowed portion is fixed a weight 23. The notches 19 are so positioned that normally the weight 23 causes the door or flap to close the opening 18 as shown in full lines in Figure 3. And it will be observed that animals desiring to drink can readily push the bottom of the flap open as shown in dotted lines in that figure, and, when the flap is released it will fall to closed position, the shock due to the weight 23 being cushioned by means of the resilient strip 22.

At the rear end of the tank there is provided a supply pipe 24 controlled by valve 25 which is in turn controlled by a float 26 within the tank so that when the water level rises to a certain point, as shown in Figure 3, the valve 25 will be closed, but when the water level drops, the valve 25 will open and the water level be restored.

In order to cover the trough there is provided a sheet metal cover 27 and this cover may be made in one or more sections as desired for the particular size of trough. Furthermore, it will be seen that with a trough constructed in accordance with this invention, barnyard litter may be packed around the trough as indicated at 28 so that in cold weather the fermentation of such litter will keep the water from freezing.

It will be seen from Figures 4, 5 and 6 that this device may be applied, not only to a line fence but, also to a field where two, three or four mouths may be used and it will be noted that in each instance the employment of these modified forms does not change the general principle involved. It will be seen that in each of the modifications the ball chamber or rear end simply has a plurality of troughs 11 radiating therefrom and at the end of each of these troughs there is a delivery opening equipped with the automatic closing door. In other words there is a central control chamber, troughs radiating therefrom and enlarged delivery chambers at the end of said troughs.

The purpose of the rear-end or control chamber extending upwardly is to give sufficient space for the float 26 and for placing the valve 25 higher than water level, preventing any trash from interfering with its proper functioning.

Another advantage of this construction is that the cover 27 is separate from the main body of the trough to allow access to the valve 25 and closure flap or door 21 for adjusting.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

A watering trough consisting of an elongated body having water admission means at one end and an access opening at the other end, said access opening being vertically arranged, a flap closure hinged at its upper edge over said opening and covering the opening within said body, a resilient strip having its ends secured respectively to the upper and lower portions of said closure and having its central portion bowed rearwardly therefrom, and a closing weight secured to the central portion of said strip.

In testimony whereof I have affixed my signature.

HENRY MARQUARDT.